(12) United States Patent
Chen et al.

(10) Patent No.: US 8,203,543 B2
(45) Date of Patent: Jun. 19, 2012

(54) PORTABLE ELECTRONIC DEVICE HAVING A SECURELY POSITIONED TOUCH CONTROL PEN

(75) Inventors: Li-Ying Chen, Keelung (TW); En-Guang Huang, Changhua County (TW)

(73) Assignees: Universal Scientific Inustrial (Shanghai) Co., Ltd., Shanghai (CN); Universal Global Scientific Industrial Co., Ltd., Nantou (TW)

( * ) Notice: Subject to any disclaimer, the term of this patent is extended or adjusted under 35 U.S.C. 154(b) by 1136 days.

(21) Appl. No.: 12/045,477

(22) Filed: Mar. 10, 2008

(65) Prior Publication Data
US 2009/0225061 A1    Sep. 10, 2009

(51) Int. Cl.
*G06F 3/033* (2006.01)

(52) U.S. Cl. ....................................................... 345/179

(58) Field of Classification Search .................. 345/179; 178/19.03, 19.04, 19.05
See application file for complete search history.

(56) References Cited

U.S. PATENT DOCUMENTS

| 6,223,294 | B1 * | 4/2001 | Kondoh | 713/310 |
| 6,337,678 | B1 * | 1/2002 | Fish | 345/156 |
| 7,083,349 | B2 * | 8/2006 | Iida et al. | 401/42 |
| 7,528,825 | B2 * | 5/2009 | Sakurai et al. | 345/179 |

* cited by examiner

*Primary Examiner* — Abbas Abdulselam

(74) *Attorney, Agent, or Firm* — Finnegan, Henderson, Farabow, Garrett & Dunner, L.L.P.

(57) ABSTRACT

A portable electronic device includes a housing configured with an elongate inner accommodating space for accommodating a touch control pen therein, and formed with a housing opening disposed at one end of the housing, in spatial communication with the inner accommodating space and permitting insertion of the touch control pen into the inner accommodating space therethrough, and a positioning groove in spatial communication with the housing opening and the inner accommodating space.

4 Claims, 7 Drawing Sheets

PORTABLE ELECTRONIC DEVICE HAVING A SECURELY POSITIONED TOUCH CONTROL PEN

BACKGROUND OF THE INVENTION

1. Field of the Invention

The invention relates to a portable electronic device, more particularly to a portable electronic device having a securely positioned touch control pen.

2. Description of the Related Art

Referring to FIGS. 1 and 2, a conventional portable electronic device, such as a personal digital assistant, is shown to include a touch control pen 4, and a housing 5. The touch control pen 4 includes a main body 41, and a resilient clip body 42 extending from one end of the main body 41. The clip body 42 is formed with an engaging projection 43. The housing 5 is configured with an accommodating space 50, and has a housing opening 51 in spatial communication with the accommodating space 50, and a top surface formed with an engaging groove 52 that engages the engaging projection 43 of the touch control pen 4 when the main body 41 is inserted into the accommodating space 50 through the housing opening 51.

However, since the engaging projection 43 of the touch control pen 4 is easily disengaged from the engaging groove 52 in the housing 5 as a result of an unintended external force, untimely removal of the touch control pen 4 from the housing 5 is likely occur.

SUMMARY OF THE INVENTION

Therefore, the object of the present invention is to provide a portable electronic device that can overcome the aforesaid drawback of the prior art.

According to the present invention, a portable electronic device comprises:

a touch control pen including an elongate main body that has a tip end, and a positioning projection extending laterally from the main body;

a housing configured with an elongate inner accommodating space extending in a longitudinal direction for accommodating the touch control pen therein, and formed with a housing opening disposed at one end of the housing, in spatial communication with the inner accommodating space and permitting insertion of the touch control pen into the inner accommodating space therethrough, and a positioning groove in spatial communication with the housing opening and the inner accommodating space; and a biasing member disposed in the inner accommodating space in the housing.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
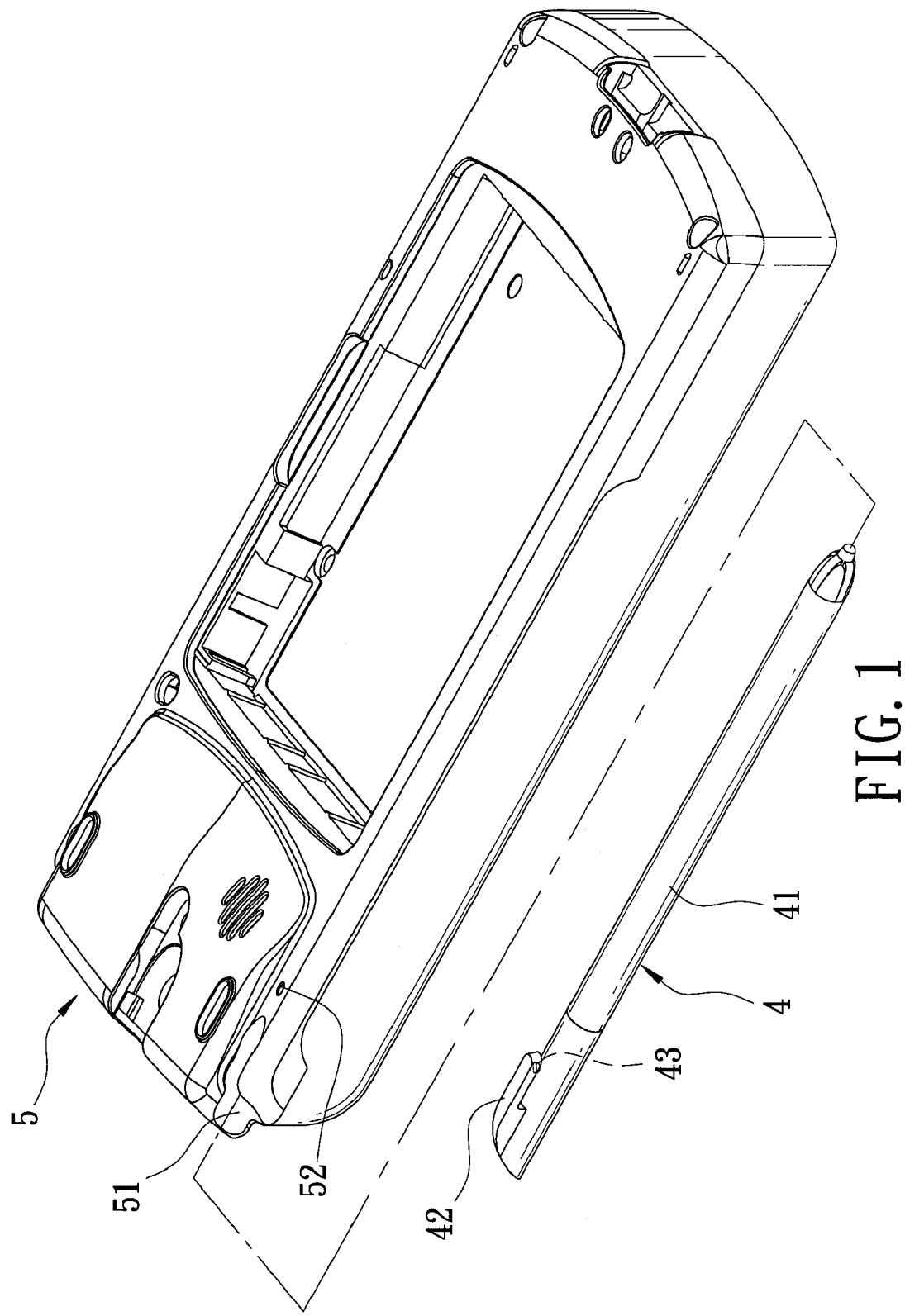
FIG. 1 is a partly exploded perspective view of a conventional portable electronic device.
Figure 2:
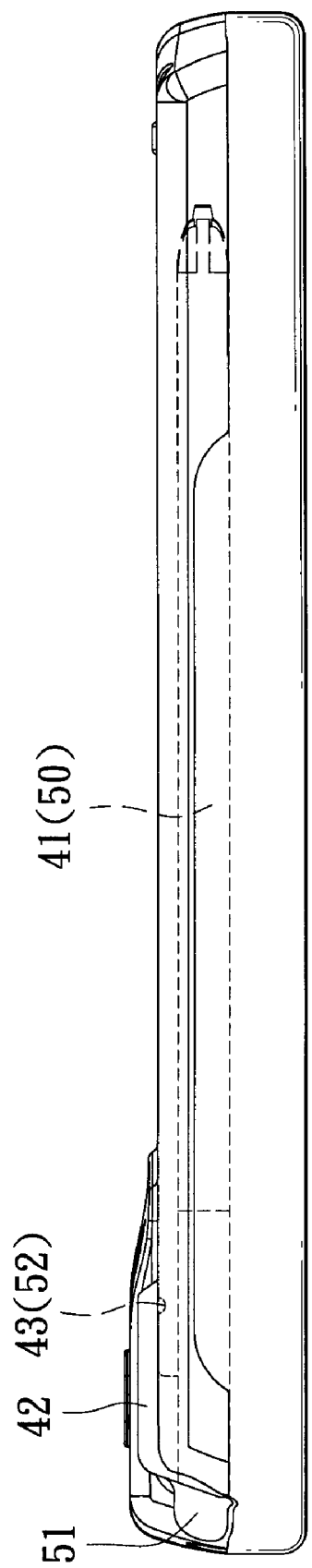
FIG. 2 is an assembled schematic side view of the conventional portable electronic device.

Referring to FIGS. 3 to 6, the preferred embodiment of a portable electronic device according to the present invention is shown to include a touch control pen 1, a housing 2, and a biasing member 3.

The touch control pen 1 includes an elongate main body 11 that has a tip end 111, and a positioning projection 12 extending laterally from the main body 11. In this embodiment, the positioning projection 12 is an elliptical projection.

Figure 3:
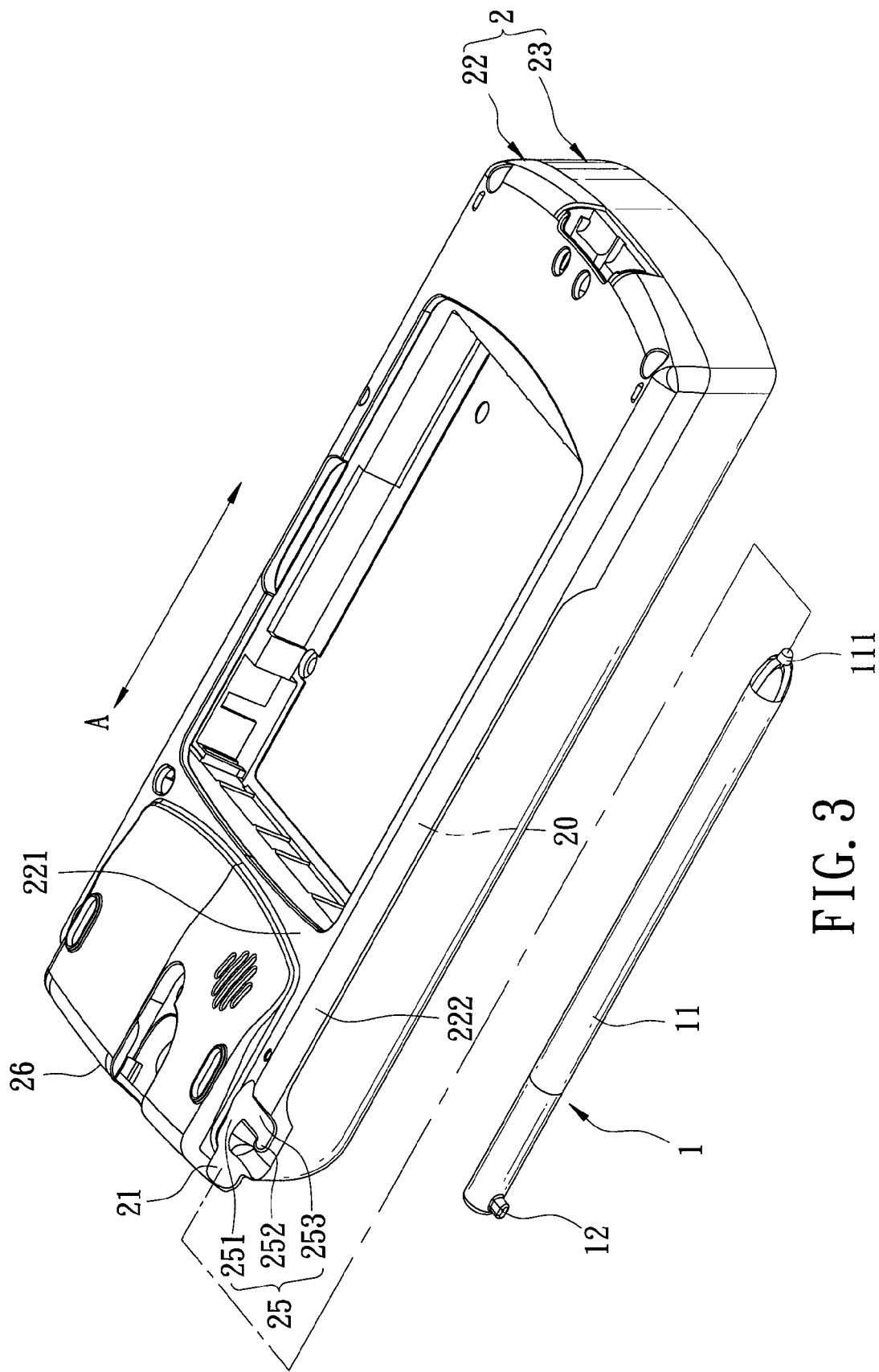
FIG. 3 is a partly exploded perspective view showing the preferred embodiment of a portable electronic device according to the present invention.
Figure 4:
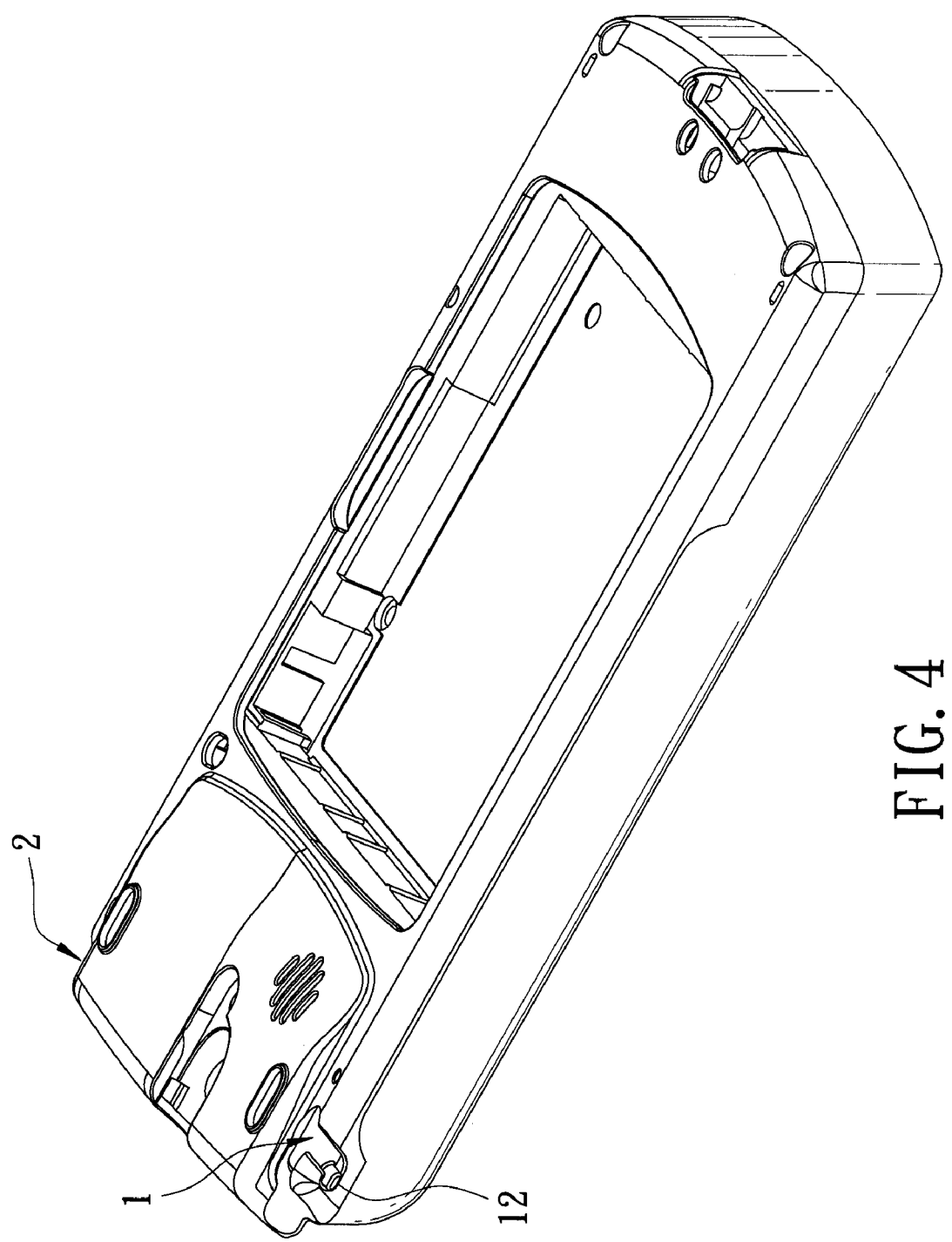
FIG. 4 is an assembled perspective view showing the preferred embodiment.
Figure 5:
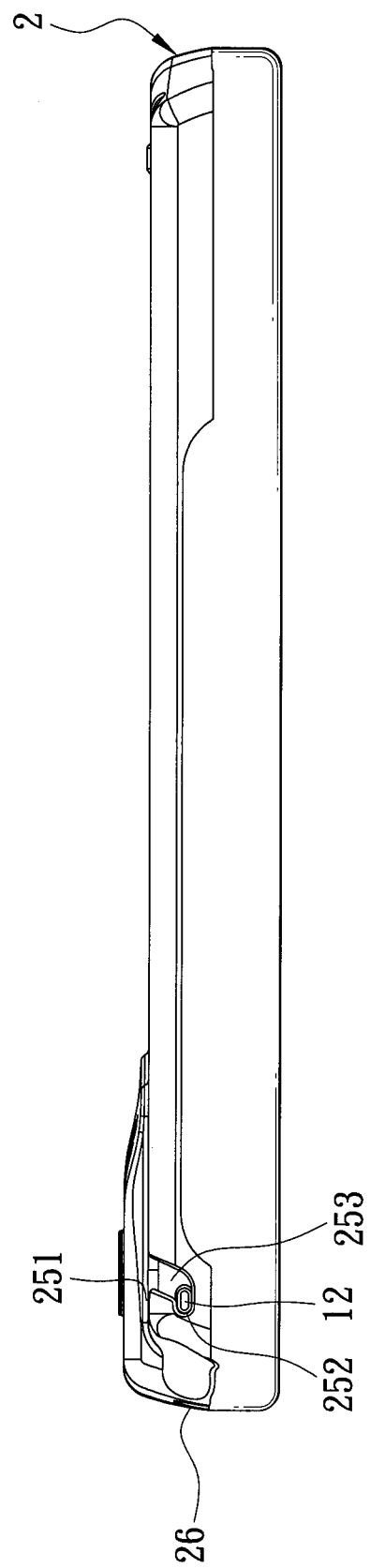
FIG. 5 is an assembled schematic side view showing the preferred embodiment.
Figure 6:
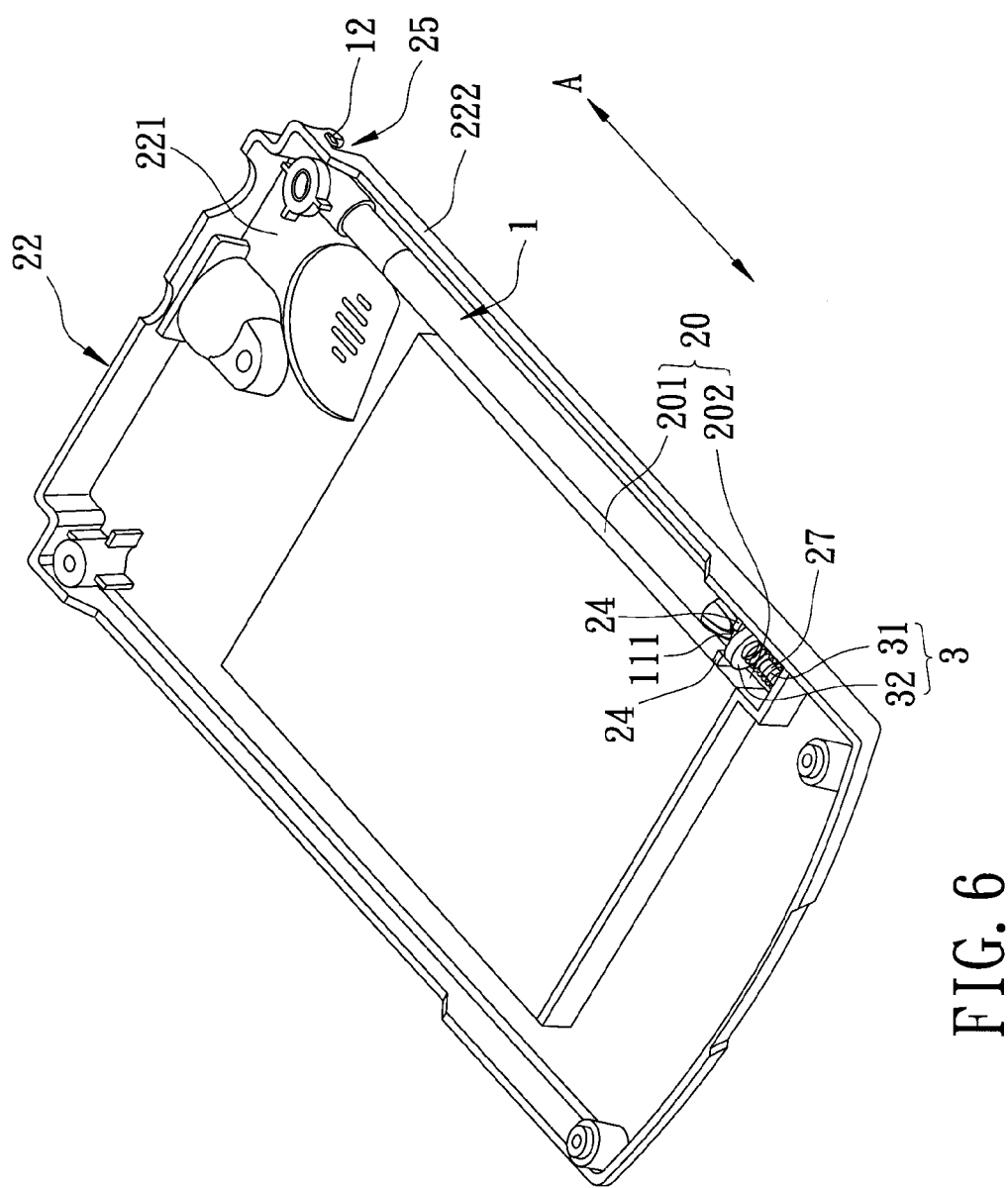
FIG. 6 is a bottom perspective view showing an assembly of a touch control pen, a biasing member, and an upper casing part of a housing of the preferred embodiment.

In this embodiment, the housing 2 consists of complementary upper and lower casing parts 22, 23 that define an elongate inner accommodating space 20 extending in a longitudinal direction (A) for accommodating the touch control pen 1 therein. The housing 2 is formed with a housing opening 21 disposed at one end 26 of the housing 2, in spatial communication with the inner accommodating space 20 and permitting insertion of the touch control pen 1 into the inner accommodating space 20 therethrough, and a positioning groove 25 in spatial communication with the housing opening 21 and the inner accommodating space 20. In this embodiment, the housing 2 includes a top wall 221, and a lateral wall having a curved upper end portion 222 connected to the top wall 221. The top wall 221 and the upper end portion 222 of the lateral wall form parts of the upper casing part 22. In this embodiment, as shown in FIG. 3, the positioning groove 25 has a first groove portion 251 formed in the top wall 221, in spatial communication with the housing opening 21 and extending in the longitudinal direction (A), a second groove portion 252 formed in the upper end portion 222 of the lateral wall and extending in the longitudinal direction (A), and a curved third groove portion 253 formed in the upper end portion 222 of the lateral wall, and interconnecting one end of the first groove portion 251 distal from said one end 26 of the housing 2 and one end of the second groove portion 252 distal from the end 26 of the housing 2. It is noted that the end of the first groove portion 251 is farther from the end 26 of the housing 2 than the end of the second groove portion 252, as best shown in FIG. 5.

Figure 7:
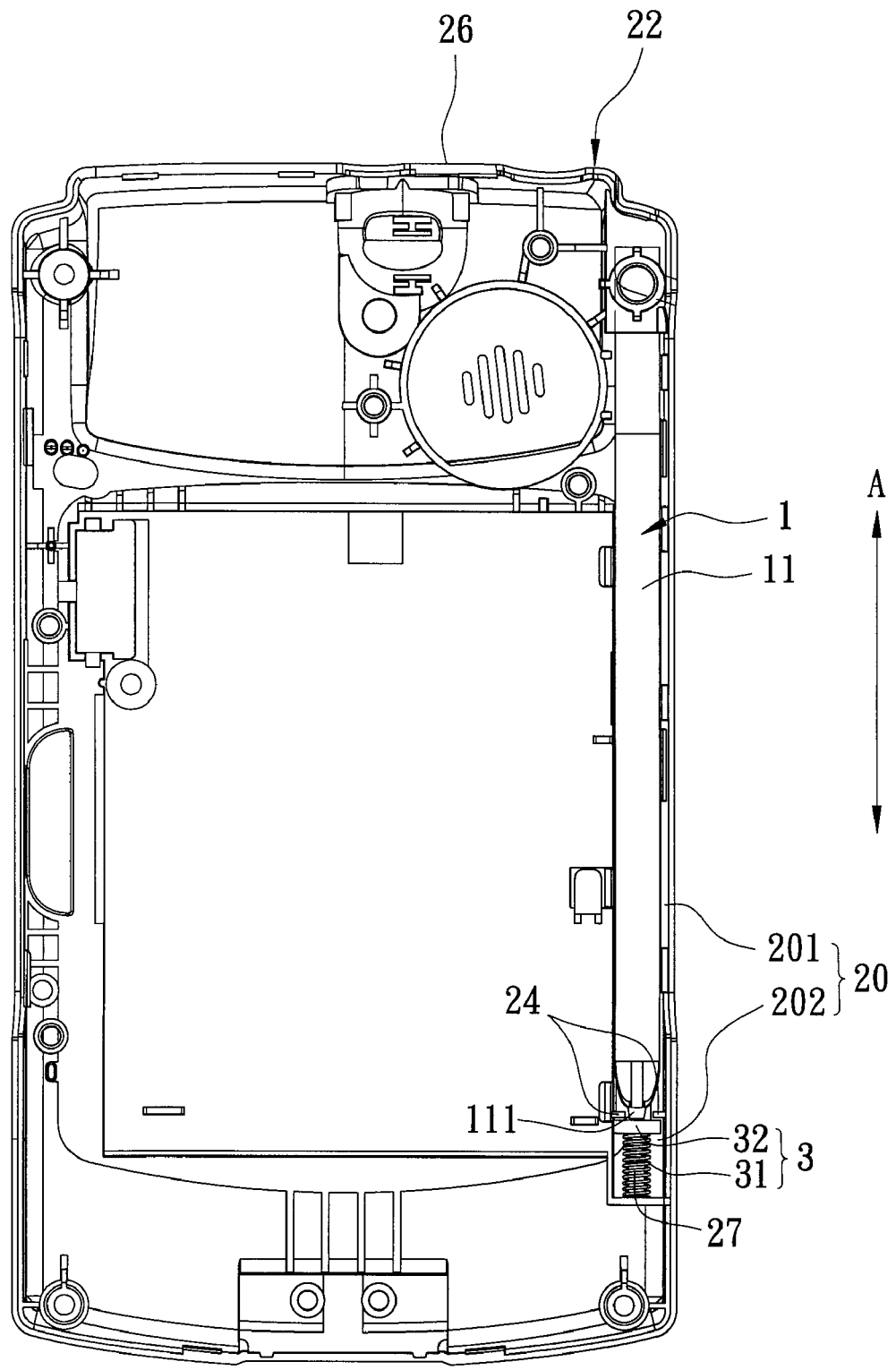
FIG. 7 is a schematic bottom view showing the assembly of the touch control pen, the biasing member, and the upper casing part of the housing of the preferred embodiment.

Referring further to FIG. 7, the housing 2 further includes opposite stop blocks 24 and a positioning rod 27. The stop blocks 24 are formed on the upper casing part 22 and are disposed fixedly and spacedly in the inner accommodating space 20 for dividing the inner accommodating space 20 into a first space portion 201 disposed proximate to the end 26 of the housing 2 for receiving the touch control pen 1, and a second space portion 202 distal from the end 26 of the housing 2. The positioning rod 27 is disposed fixedly in the second space portion 202 and extends in the longitudinal direction (A).

The biasing member 3 is disposed in the second space portion 202 of the inner accommodating space 20 in the housing 1. It is noted that, due to the presence of the stop blocks 24, removal of the biasing member 3 is from the second space portion 202 can be prevented. In this embodiment, the biasing member 3 includes a coil spring 31 sleeved on the positioning rod 27, and a pushing block 32 mounted on one end of the coil spring 31.

During assembly of the touch control pen 1 to the housing 2, firstly, the touch control pen 1 is inserted into the first space portion 201 of the inner accommodating space 20 in the housing 2 through the housing opening 21 while the positioning projection 12 of the touch control pen 1 moves along the first groove portion 251 of the positioning groove 25. Subsequently, the positioning projection 12 is rotated so as to move along the third groove portion 253 of the positioning groove 25, and then engage the second groove portion 252 of the positioning groove 25 as a result of a biasing force from the coil spring 31 of the biasing member 3, thereby preventing removal of the touch control pen 1 from the housing 2. At this time, the pushing block 32 abuts against the tip end 111 of the main body 11 of the touch control pen 1, and is spaced apart from the stop blocks 24, as shown in FIG. 7.

On the other hand, during disassembly of the touch control pen 1 from the housing 2, the positioning projection 12 of the touch control pen 1 is disengaged forcibly from the second groove portion 252 of the positioning groove 25 against the biasing action of the biasing member 3, and is rotated to move into the first groove portion 251 of the positioning groove 25. At this time, the pushing block 32 pushes the tip end 111 of the main body 11 of the touch control pen 1 as a result of the biasing force from the coil spring 31 to move toward the end 26 of the housing 2 in the first space portion 201 of the inner accommodating space 20 until the pushing block 32 comes into contact with the stop blocks 24.

In sum, due to the presence of the positioning groove 25 in the housing 2 and the positioning projection 12 of the touch control pen 1, the touch control pen 1 can be securely positioned in the housing 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A portable electronic device comprising:
    a touch control pen including an elongate main body that has a tip end, and a positioning projection extending laterally from said main body;
    a housing configured with an elongate inner accommodating space extending in a longitudinal direction for accommodating said touch control pen therein, and formed with a housing opening disposed at one end of said housing, in spatial communication with said inner accommodating space and permitting insertion of said touch control pen into said inner accommodating space therethrough, and a positioning groove in spatial communication with said housing opening and said inner accommodating space; and
    a biasing member disposed in said inner accommodating space in said housing;
    wherein said housing includes a top wall, and a lateral wall having a curved upper end portion connected to said top wall; and
    wherein said positioning groove has a first groove portion formed in said top wall, in spatial communication with said housing opening and extending in the longitudinal direction, a second groove portion formed in said upper end portion of said lateral wall and extending in the longitudinal direction, and a curved third groove portion formed in said upper end portion of said lateral wall, and interconnecting one end of said first groove portion distal from said one end of said housing and one end of said second groove portion distal from said one end of said housing, said end of said first groove portion being farther from said one end of said housing than said end of said second groove portion.

2. The portable electronic device as claimed in claim 1, wherein:
    said inner accommodating space has a first space portion disposed proximate to said one end of said housing for receiving said touch control pen, and a second space portion distal from said one end of said housing for receiving said biasing member; and
    said housing further includes opposite stop blocks disposed fixedly and spacedly in said inner accommodating space for dividing said inner accommodating space into said first and second space portions and for preventing removal of said biasing member from said second space portion.

3. The portable electronic device as claimed in claim 2, wherein:
    said housing further includes a positioning rod disposed fixedly in said second space portion of said inner accommodating space in said housing and extending in the longitudinal direction; and
    said biasing member includes a coil spring sleeved on said positioning rod, and a pushing block mounted on one end of said coil spring.

4. The portable electronic device as claimed in claim 1, wherein said positioning projection is an elliptical projection.

* * * * *